United States Patent [19]

Brown

[11] 4,260,011

[45] Apr. 7, 1981

[54] THERMOSTATICALLY CONTROLLED LIQUID COOLING APPARATUS FOR OUTBOARD MOTORS

[76] Inventor: George Brown, 317 S. Harbor Dr., Venice, Fla. 33595

[21] Appl. No.: 2,760

[22] Filed: Jan. 11, 1979

[51] Int. Cl.[3] .............................................. G05D 23/00

[52] U.S. Cl. ........................................ 165/35; 165/36; 165/51; 236/34.5; 123/41.09

[58] Field of Search ........................ 165/34, 35, 36, 51, 165/103; 236/34.5, 93 R; 123/41.08, 41.09, 41.10, 41.29, 41.44, 41.47; 440/88, 89

[56] References Cited

U.S. PATENT DOCUMENTS

| | | | |
|---|---|---|---|
| 2,377,028 | 5/1945 | Nicholas | 123/41.09 |
| 2,513,124 | 6/1950 | Weiks | 165/35 |
| 2,706,085 | 4/1955 | Nallinger | 236/34.5 X |
| 3,080,857 | 3/1963 | Middendorf | 236/34.5 X |
| 3,125,081 | 3/1964 | Jasper | 123/41.09 |
| 3,136,337 | 6/1964 | Fox | 236/34.5 X |
| 3,380,466 | 4/1968 | Sarra | 123/41.09 |
| 3,892,209 | 7/1975 | Amiot | 123/41.09 |

FOREIGN PATENT DOCUMENTS

| | | | |
|---|---|---|---|
| 2384106 | 11/1978 | France | 123/41.1 |

*Primary Examiner*—Albert W. Davis
*Assistant Examiner*—Margaret A. Focarino

[57] ABSTRACT

Apparatus for cooling outboard motors, comprising a closed circuit for circulating a liquid such as fresh water through the portions of an outboard motor to be cooled. The circuit includes a thermostatically controlled mixing valve and a heat exchanger. The mixing valve is disposed between the cooling lines of the outboard motor and the heat exchanger, and is connected to an outlet line from the outboard motor, the inlet of the heat exchanger, and an inlet line running from the outlet of the heat exchanger to a cooling line of the outboard motor. A temperature responsive device is connected to the outlet line from the motor and is operatively connected to a circulating pump in the inlet line to the motor, and also to a circulating pump which is connected to the heat exchanger so as to circulate cooling fluid, such as sea water, therethrough. When the temperature of the cooling water leaving the outboard motor is below a predetermined value, the mixing valve directs the water from the outlet line from the motor to the inlet line for the motor, without diverting any cooling water to the heat exchanger. When, however, the cooling water leaving the motor exceeds the predetermined temperature, the mixing valve is moved to the appropriate position depending on the temperature to divert a part of the fresh water to the heat exchanger and part of the fresh water to the motor, or all of the fresh water from the outlet line to the heat exchanger for the purpose of cooling the fresh water before it is circulated back to the inlet line for the motor.

4 Claims, 1 Drawing Figure

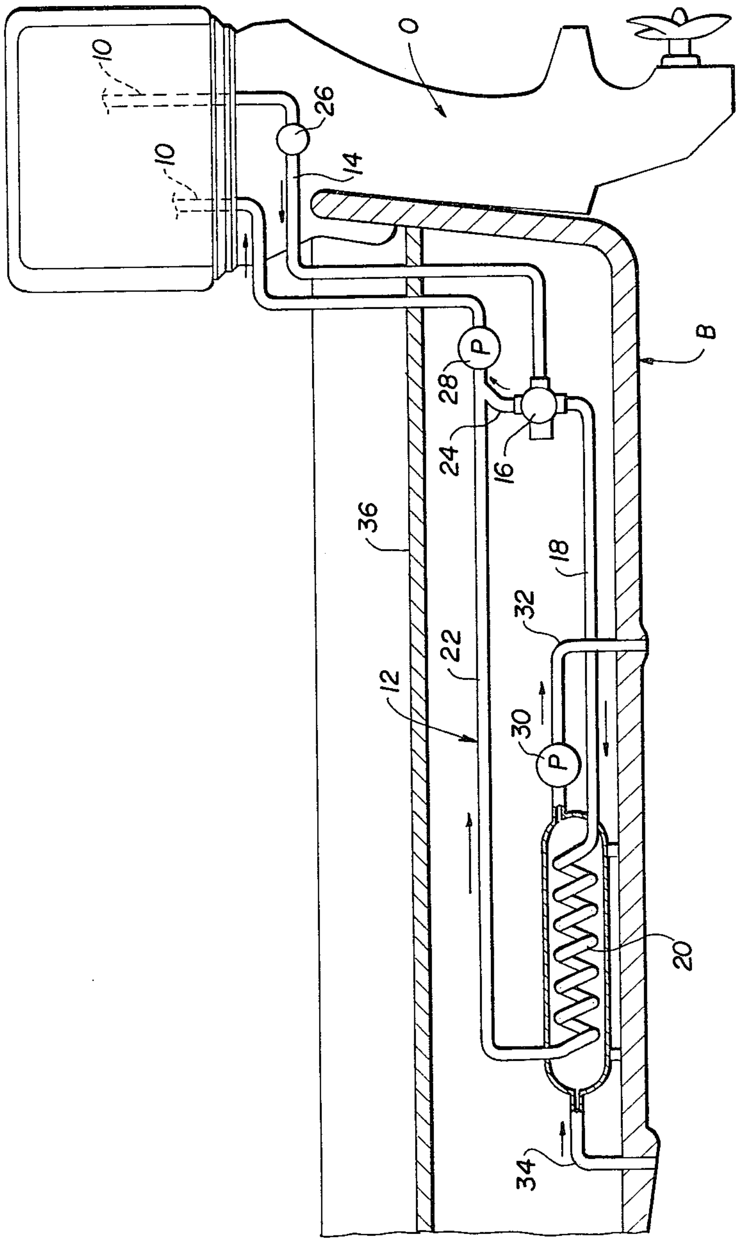
O
10
10
26
14
B
P
28
24
16
36
18
32
22
12
P
30
20
34

THERMOSTATICALLY CONTROLLED LIQUID COOLING APPARATUS FOR OUTBOARD MOTORS

BACKGROUND OF THE INVENTION

The present invention relates to the liquid cooling of outboard motors and, more particularly, to thermostatically controlled liquid cooling apparatus for such motors.

Heretofore, most outboard motors have been cooled by circulating ambient water therethrough. In many cases, the ambient water is salt water which tends to corrode the motor block or manifold through which it is circulated. Also, the ambient water, whether salt water or fresh water, may contain contaminants which will obstruct or corrode the motor block or manifold. For these reasons, the cooling systems used for outboard motors have not been completely satisfactory.

Accordingly, a need has arisen for a new and improved cooling apparatus for outboard motors which is not subject to such corrosion or obstruction problems.

SUMMARY OF THE INVENTION

The present invention fulfills this need by providing cooling apparatus for outboard motors wherein liquid such as fresh water is circulated through the outboard motor in a closec circuit wherein the temperature of the fresh water is thermostatically controlled by a temperature responsive mixing valve and a heat exchanger.

The new and improved cooling apparatus of the present invention comprises a closed circuit for circulating a liquid through the portions of an outboard motor to be cooled. The circuit includes a thermostatically controlled mixing valve and a heat exchanger. The mixing valve is disposed between the cooling lines of the outboard motor and the heat exchanger, and is connected to an outlet line from the outboard motor, the inlet of the heat exchanger, and an inlet line running from the outlet of the heat exchanger to a cooling line of the outboard motor. A temperature responsive device is connected to the outlet line from the motor and is operatively connected to a circulating pump in the inlet line to the motor, and also to a circulating pump which is connected to the heat exchanger so as to circulate cooling fluid, such as sea water, therethrough.

When the temperature of the cooling liquid leaving the outboard motor is below a predetermined value, the mixing valve directs liquid from the outlet line from the motor to the inlet line for the motor, without diverting any cooling liquid to the heat exchanger. When, however, the cooling liquid leaving the motor exceeds the predetermined temperature, the mixing valve internal mechanism is moved to an appropriate position depending on the temperature setting, to divert part of the liquid through the mixing valve opening to the heat exchanger and at the same time a part of the liquid is diverted through the mixing valve to the inlet of the outboard motor, or to divert all of the liquid from the outlet line to the heat exchanger, for the purpose of cooling the liquid before it is circulated back to the inlet line for the motor.

BRIEF DESCRIPTION OF THE DRAWING

The drawing is a side elevational view of an outboard motor and the rear portion of a boat, showing in schematic form the cooling apparatus of the present invention.

DESCRIPTION OF THE PREFERRED EMBODIMENT

As shown in the drawing, an outboard motor O is mounted in any suitable manner on the rear portion of a boat B. The outboard motor O comprises a cooling line 10, shown in broken lines in the drawing, for circulating a cooling liquid, such as fresh water, through the motor for the purpose of cooling it. In accordance with the present invention, a closed circuit 12 is connected to the cooling line 10 of the outboard motor O for the purpose of recirculating a liquid through the motor for cooling purposes.

The closed circuit 12 comprises an outlet line 14 connected at one end to the outlet portion of the motor cooling line 10 and connected at the other end thereof to the inlet of a thermostatically controlled mixing valve 16 of any suitable construction and operation. As an illustrative example, the mixing valve 16 may be a tempering and mixing valve of the type manufactured and sold by Holby ® Valve Company, Inc., New York, N.Y., or the equivalent. Such valves include a temperature responsive means, such as a thermostat, for controlling the liquid volume and flow through the valve and also the temperature of the cooling liquid entering the motor. In this manner, it is possible to direct the incoming liquid in the mixing valve to one or the other outlet independently or partially to both outlets, depending on the thermostat temperature setting thereof and the temperature of the incoming liquid.

A line 18 is connected at one end thereof to one outlet of the mixing valve 16 and at the other end thereof to a heat exchanger 20 of any suitable type. A line 22 extends from the heat exchanger 20 to the inlet portion of the motor cooling line 10. Another line 24 extends from the second outlet of the mixing valve 16 to the line 22.

A temperature responsive means 26, such as an aquastat or the equivalent, is positioned in the line 14 and is operatively connected to a first circulating pump 28 in line 22 and to a second circulating pump 30 in an outlet line 32 extending from the heat exchanger 20 through the hull of the boat B to the ambient water. An inlet line 34 extends from the heat exchanger 20 through the hull of the boat B for the purpose of admitting ambient water into the heat exchanger.

When the temperature of the cooling liquid leaving the motor cooling line 10 exceeds a predetermined value, the temperature responsive means 26 serves to activate the first pump 28 for circulating the liquid through the circuit 12 to and from the motor cooling line 10. The temperature responsive means 26 also serves to activate the second pump 30 for circulating ambient water, such as sea water, through the hull of the boat and through the heat exchanger 20 for the purpose of cooling the liquid in the circuit 12 passing through the heat exchanger.

The mixing valve 16 serves to direct the incoming liquid from line 14 to line 18 or line 24, or to lines 18 and 24, depending on the temperature of the incoming liquid. As an illustrative example, if the temperature of the incoming liquid were below a predetermined level such that it did not require cooling, the mixing valve 16 would direct the entire flow from line 14 through line 24, into line 22 and back into the motor cooling line 10, without directing any liquid through line 18 and the heat exchanger 20. If, on the other hand, the temperature of the incoming liquid in line 14 exceeds a predetermined value, the mixing valve 16 would direct all of the liquid to the line 18 and heat exchanger 20, or only a portion of the volume of the liquid to line 18 and the balance of the incoming liquid from line 14 would be diverted to line 24, depending on the amount of cooling required to bring it back to the predetermined temperature.

The cooling apparatus of the present invention, including the circuit 12, the mixing valve 16 and the heat exchanger 20 may be provided in any suitable location within or without the boat B, such as beneath the deck 36 of the boat as shown in the drawing.

The operation of the cooling apparatus of the present invention should be apparent from the description herein. Briefly, when the cooling liquid entering the line 14 from the motor line 10 exceeds a predetermined temperature, the temperature responsive means 26 activates the first pump 28 to circulate cooling liquid through the motor and also activates the second pump 30 to circulate ambient water, such as sea water, through the heat exchanger 20. At the same time, the mixing valve 16 directs all or a portion of the cooling liquid from line 14 through line 18 to the heat exchanger 20 and at the same time diverts a portion of the liquid through line 24, depending on the amount of cooling required for the purpose of cooling the liquid before it is returned to the motor through line 22 or line 24, or through both line 22 and line 24. In this manner, the cooling liquid circulating through the motor cooling line 10 is kept at a predetermined temperature for optimum cooling and operation of the motor. Since the cooling liquid is being circulated through a closed circuit, it is free from contaminants and thus will not corrode or obstruct the cooling line 10 through motor O.

It is noted that, within the scope of the present invention, the cooling liquid may be fresh water or any other suitable liquid that will not corrode the motor block or manifold.

What is claimed is:

1. Liquid cooling apparatus for an outboard motor, comprising:

a temperature responsive mixing valve having an inlet and two outlets, a first line connecting the motor to the inlet of said mixing valve, temperature responsive means positioned in said first line, a heat exchanger having an inlet and an outlet, a second line connecting one outlet of said mixing valve to the inlet of said heat exchanger, a third line connecting the outlet of said heat exchanger to the motor, a first pump positioned in said third line, said temperature responsive means being operatively connected to said first pump to activate it for the circulation of cooling liquid when the temperature of the cooling liquid in said first line exceeds a predetermined temperature, means for connecting said heat exchanger to ambient water for cooling the cooling liquid passing through said heat exchanger from said second line to said third line, a second pump positioned in said connecting means for circulating ambient water through said heat exchanger, said second pump being operatively connected to said temperature responsive means, and a fourth line connecting the other outlet of said mixing valve to said third line, whereby said mixing valve directs cooling liquid in said first line to said second line or said fourth line or to said second and fourth lines in response to the temperature of the cooling liquid in said first line.

2. The cooling apparatus of claim 1 wherein the cooling liquid is a liquid that will not corrode the motor.

3. The cooling apparatus of claim 2 wherein the cooling liquid is fresh water.

4. The cooling apparatus of claim 1 wherein said first line, said second line, said third line and said fourth line form a closed circuit with said mixing valve, said heat exchanger and the motor for the circulation of cooling liquid therethrough.

* * * * *